Sept. 2, 1952 C. L. G. BÉNARD 2,609,484
LIGHTING OF OPERATING ROOMS
Filed May 10, 1949 6 Sheets-Sheet 1

Inventor
Christian Louis Georges Benard,
By Flocks and Simon
Attorneys

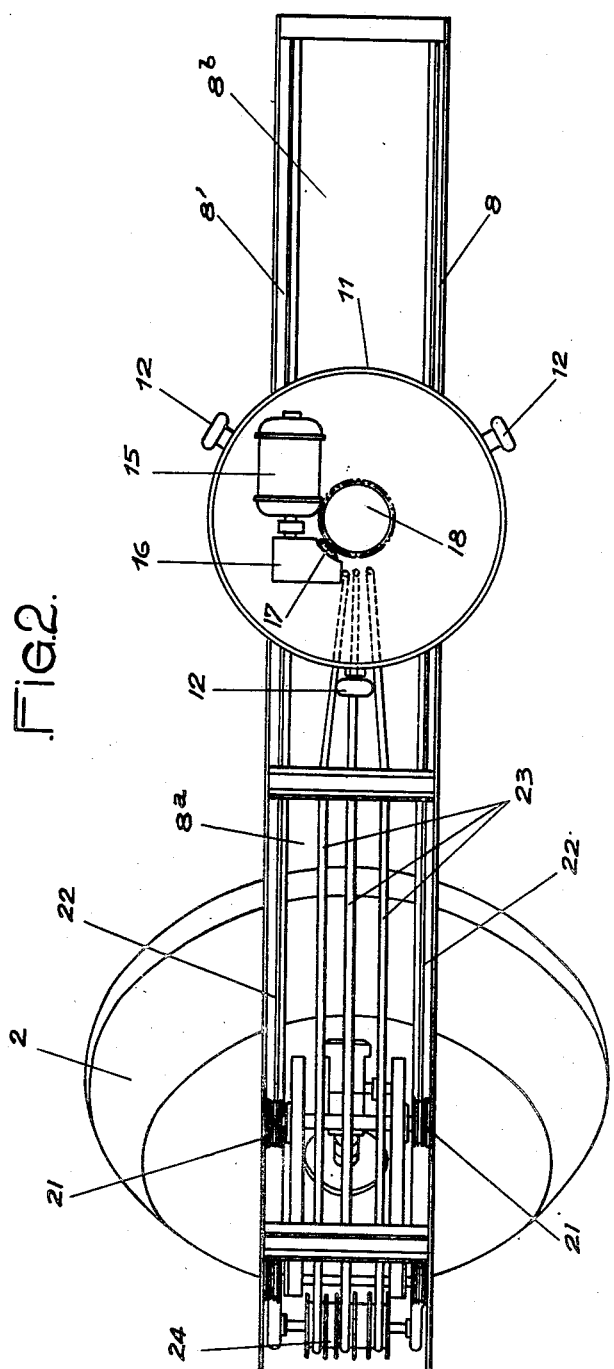

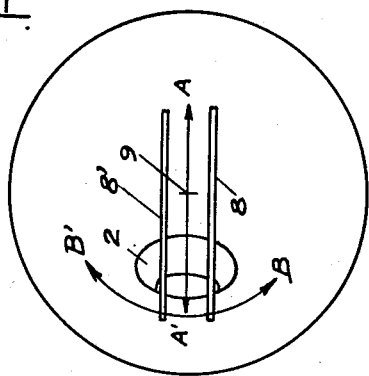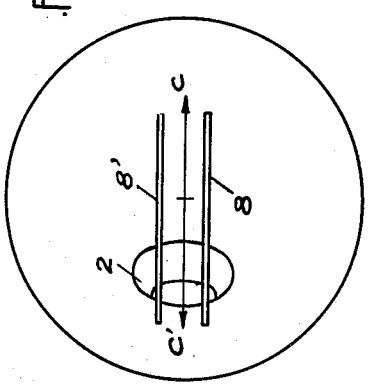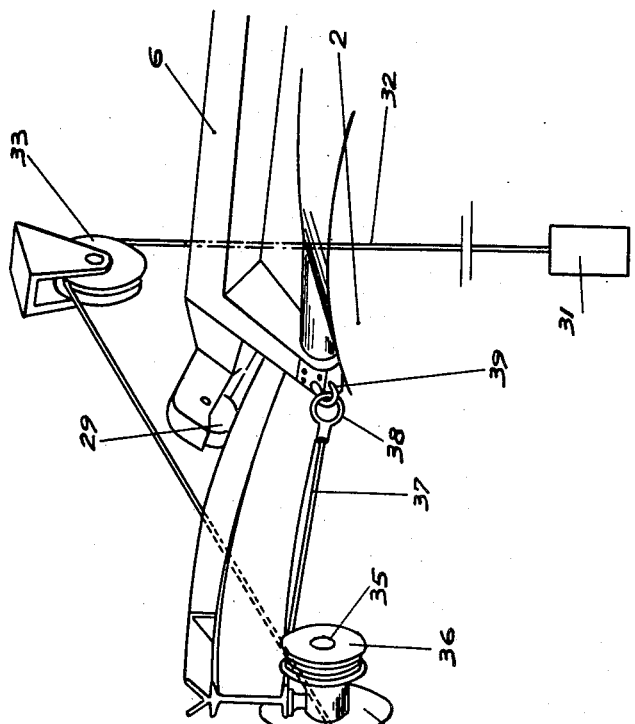

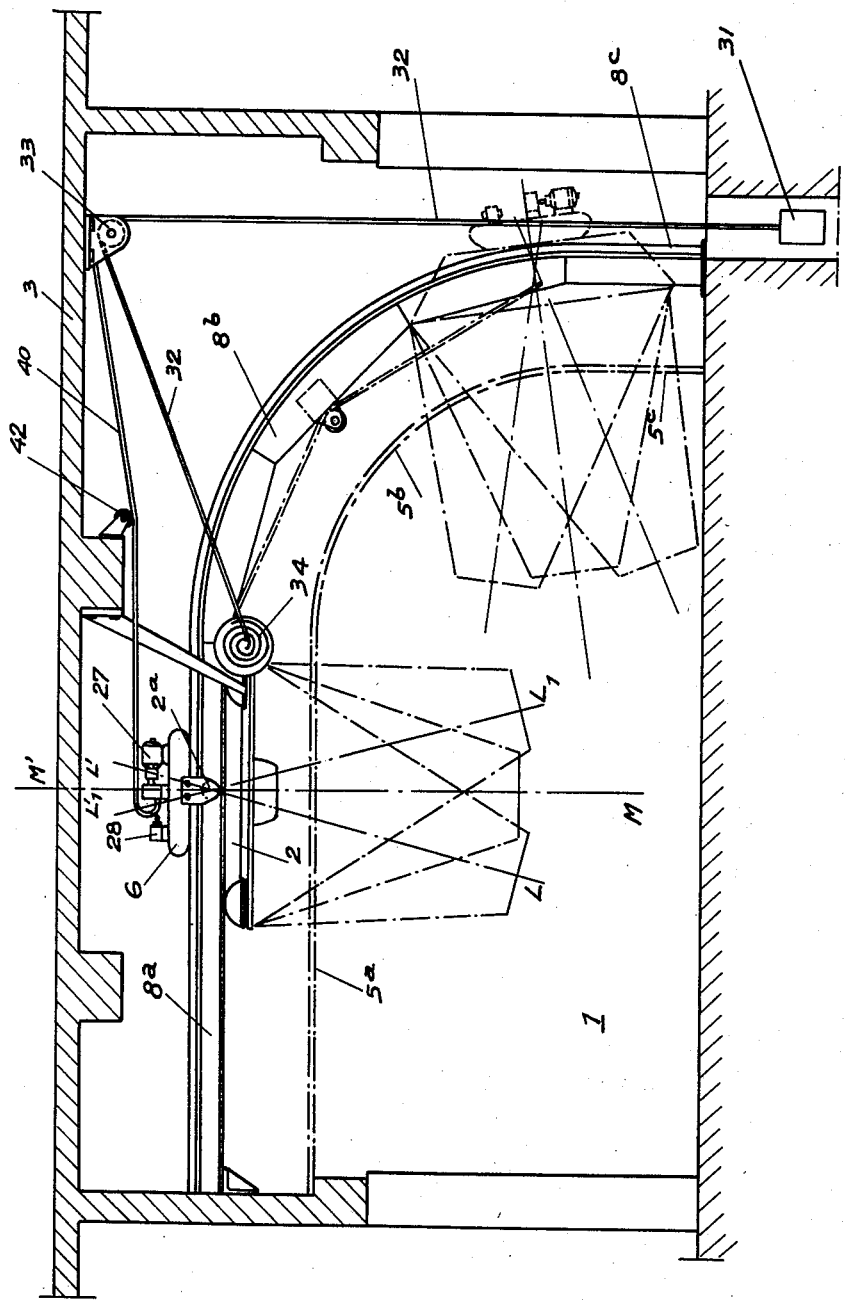

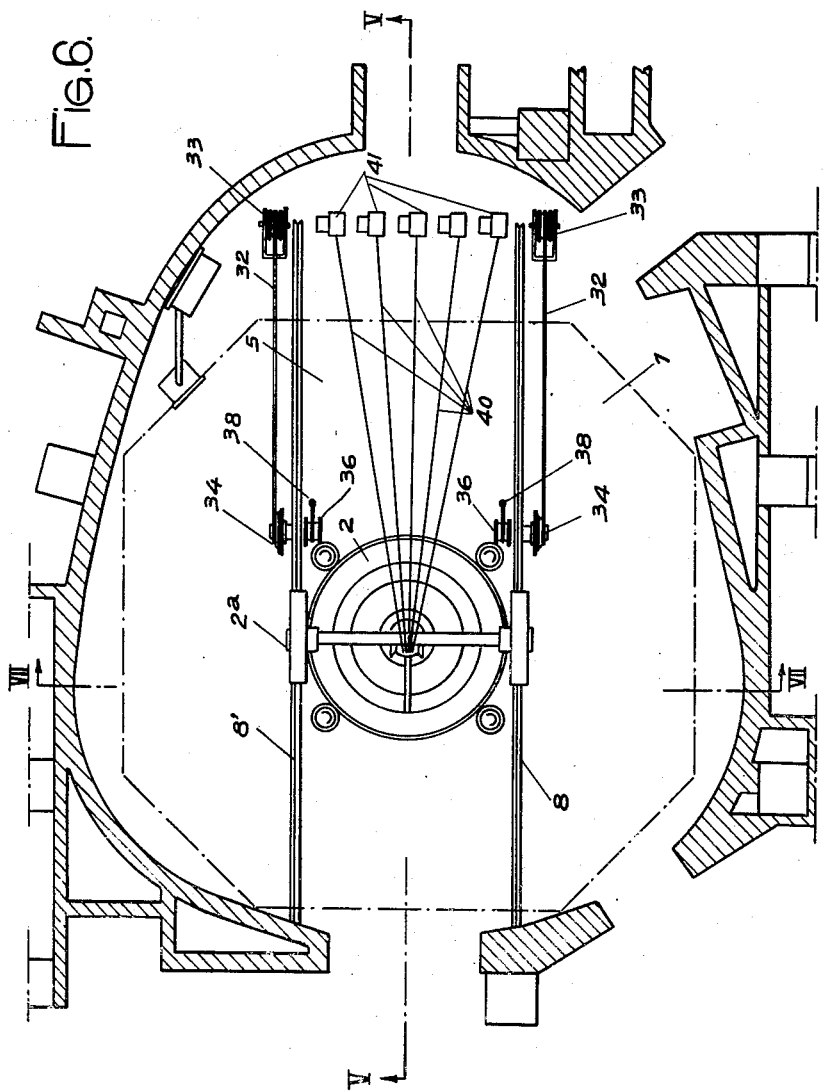

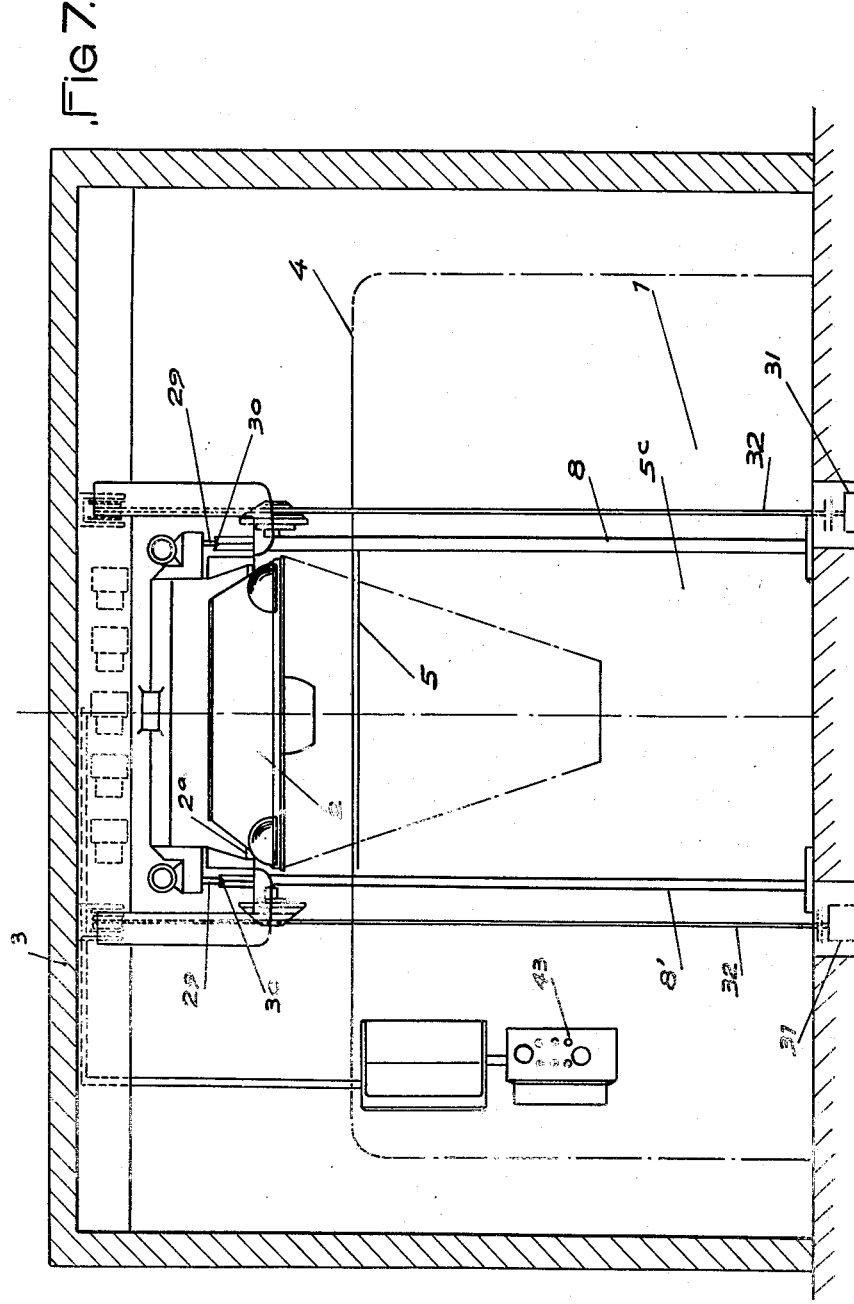

Patented Sept. 2, 1952

2,609,484

UNITED STATES PATENT OFFICE 2,609,484

LIGHTING OF OPERATING ROOMS

Christian Louis Georges Bénard, Paris, France, assignor to Anciens Etablissements Barbier-Benard & Turenne, Paris, France, a joint-stock company of France Application May 10, 1949, Serial No. 92,465
In France June 1, 1948

3 Claims. (Cl. 240—1.4)

The present invention relates to improvements in the lighting of operating rooms, wherein the source of lighting is completely separated from the room so as to enable complete asepsis of said room to be obtained.

The heretofore known lighting devices of this type, in particular the one described in United States Patent No. 2,243,788 in the name of the present applicant, have a serious drawback inasmuch as in order to obtain the different lighting inclinations which are necessary for the operational requirements, the lighting apparatus is moved longitudinally along a horizontal beam. Consequently, the distance between the lighting apparatus and the field of operation varies with the inclination and is greater as said inclination itself is greater. As a result of this, the illumination decreases proportionally to the increase in the distance. In order to keep the conditions of illumination as constant as possible, it has been proposed to act on the voltage of the supply current of the lamp in order to increase or decrease the brightness thereof, but in any case the lighting effect without umbrae is not constant since it is dependent on the position of the lamp.

The present invention relates to improvements which obviate these drawbacks.

Said improvements are essentially characterised by the fact that the lighting apparatus, which is preferably of the type that eliminates the umbrae, is adapted to move above a transparent false ceiling, along a track of the shape of an arc of a circle, the centre of which is the pole of operation, so as to produce an absolutely constant illumination and lighting effect without umbrae, irrespective of the position of the lighting apparatus.

Other features and advantages of the present invention will become apparent from the description thereof which will be given hereinafter with reference to the accompanying drawings which illustrate diagrammatically and merely by way of example, various embodiments of the invention.

In these drawings:

Fig. 1 an elevational view of an operating room provided with a lighting apparatus according to the present invention.

Fig. 2 is a plan view of the suspension and control device of the lighting apparatus.

Figs. 3 and 4 are diagrams showing the two principal methods of mounting the suspension device of the lighting apparatus, according to two embodiments of the invention.

Fig. 5 is a sectional elevation, along the line V—V of Fig. 6, which is a similar view to that of Fig. 4 but shows a modification of construction that enables, if necessary, a horizontal lighting to be obtained.

Fig. 6 is a plan view of this modification of construction, the ceiling not being shown for the sake of clarity of the drawing.

Fig. 7 is a sectional view thereof, taken along the line VII—VII of Fig. 6.

Fig. 8 is a perspective detail view of the balancing device of the lighting apparatus.

Figure 1:
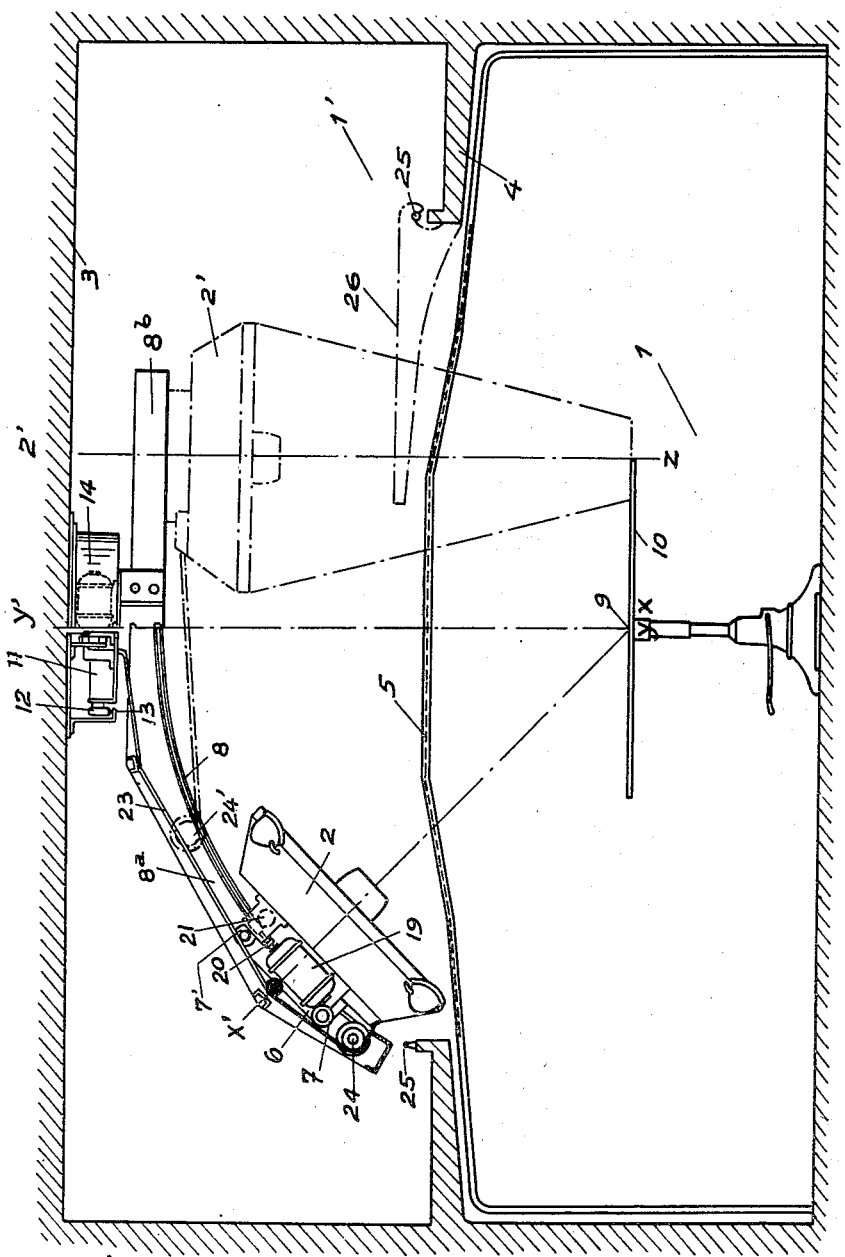

In Fig. 1, an operating room 1 provided with a lighting apparatus 2 according to the invention is shown diagrammaticaly, said lighting apparatus being located between the normal ceiling 3 of the room and a false ceiling 4 in which is provided a translucent portion formed for example by a glazed portion 5. Said glazed portion has no sharp corners so as to enable an optimum sterilizing and conditioning of the air in the operating room to be effected.

The lighting apparatus 2 is preferably of the type that eliminates the umbrae, such as the one described in the aforesaid United States Patent No. 2,243,788. The lighting apparatus is mounted on a support 6 provided with two wheel-trains 7, 7' adapted to rest on a track 8, 8'. Said track includes a portion of the shape of an arc of a circle 8a, the centre of which is the lighting pole 9 located at the centre of the room 1 and on the operating table 10, at a suitable height for the surgeon. On the other hand, the track is extended by a straight horizontal portion 8b of suitable length.

It can be seen that with a track of this shape, the lighting apparatus can be made to assume any desired position between an extreme position XX' inclined at 45°, that enables the so-called "Trendelenburg" lighting to be obtained, and an extreme vertical position ZZ', passing through an intermediate vertical position YY'.

In all the positions of the lighting apparatus between the axes XX' and YY', the lighting pole remains stationary at 9; on the other hand, when the lighting apparatus moves along the straight portion 8b of the track, between the axes YY' and ZZ', the lighting pole moves along the horizontal operating plane that passes through the point 9, the distance between the lighting apparatus and the operating field remaining constant, thereby retaining the illumination and the lighting effect without umbrae of the lighting apparatus and making it possible, in particular in certain surgical operations of the bones and the like, to move the vertical lighting according to the requirements of the operation.

According to a first embodiment shown in Figs.

1 and 3, the track 8, 8' is mounted, along the axis YY', on a carriage 11 provided with rollers 12 adapted to roll on a circular track 13 housed in a cupola 14 fixed to the ceiling 3. The rotary movements of the carriage 11 are controlled, for example by means of an electric motor 15 which is secured to said carriage and which actuates, by means of a suitable speed reducer 16, a toothed wheel 17 meshing with a stationary pinion 18. It is quite obvious that this method of control could be replaced by any other known device such, for example, as a worm which is directly actuated by the motor 15 and which meshes with a stationary wheel.

The longitudinal movements of the lighting apparatus along the track 8, 8' are controlled, for example, by means of an electric motor 19 which is secured to the support 6 of the lighting apparatus and which actuates, by means of a suitable speed reducer 20, an endless drum 21 on the two ends of which are adapted to wind stationary cables 22 arranged along the two rails of the track 8, 8'.

The supply of electric current to the motor 19 and to the lighting apparatus 2 is effected by means of a suitable number of cables 23 that wind on a return drum 24 adapted to move along the track. Said drum is provided with rollers which enable it to move half as fast as the lighting apparatus; in this manner, when the lighting apparatus reaches its extreme position ZZ' at 2', the drum is only in the position shown in dot-and-dash lines at 24', and the cables are always suitably taut and never become slack.

The device which has just been described enables optimum lighting to be obtained on the operation table irrespective of the working position, owing to the fact that the lighting can be moved (see Fig. 3) along a meridian plane A—A' which in turn can rotate in all the azimuths B, B' about the centre 9 of the room. The great advantage of this arrangement is that by keeping the lighting pole at the centre of the operating room, the surgeon is sure of having sufficient space about said pole and around the operating table or other support. In fact the distance from the pole to the wall of the operating room is nearly equal to the radius of said room which is of circular shape.

According to a simplified embodiment of the invention (see Fig. 4), the track 8, 8' is directly fixed to the ceiling in a predetermined direction and the lighting apparatus can only move along a predetermined meridian C, C' along which the operating table and the patient must always be placed.

The lighting apparatus which has just been described is therefore suitable for any shape of operating room. In the case of the usual rectangular rooms, the simplified arrangement of Fig. 4 is in general preferable; on the other hand, in polygonal or round rooms, which at the present time are considered more advantageous, there is a choice between the simplified arrangement of Fig. 4 if it is assumed that there is an axis of operation, and the universal arrangement of Fig. 3 if the surgeon is required to operate in all the azimuths.

If the equipment is intended for teaching surgery, the independent upper chamber 1' which is located between the ceiling 3 and the false ceiling 4 and in which the whole mechanism and the lighting apparatus are enclosed, can be arranged as a viewing gallery for students who can follow all the phases of the surgical operation through the glazed portion 5 which is transparent.

On the other hand, in order to enable the lighting apparatus to be attended to and cleaned, together with the glazed portion, a rail 25 may advantageously be provided all round the balcony that bounds the glazed portion, and a suitably braced metal support 26 can be hooked on to said rail, for the use of the attendants.

Owing to the evolution of surgical technique, certain operations may require a vertical lighting or, at any rate, a more inclined lighting than the so-called "Trendelenburg" lighting in the usual 45° position. This is in particular the case of operations of thoracoplasty in which the patient is operated in a sitting position with the thorax vertical, which requires a horizontal lighting on the field of operation which is vertical in this case.

In order to meet these particular requirements, a modified embodiment of the invention is provided as shown in Fig. 5.

According to this modification which, in the example shown, is of the type in which the lighting apparatus is adapted to be moved solely along a meridian, the operating room 1 is provided, as in the previous cases, with a glazed portion 5. But this glazed portion includes a horizontal portion 5a which is joined by a quarter cylindrical portion 5b to a vertical portion 5c.

The track 8, 8' is of the same shape as this ceiling, i. e. it comprises a straight horizontal portion 8a, a quarter circular portion 8b and a straight vertical portion 8c. Said track is fixed along a meridian of the room, a suitable distance from the glazed portion to enable the lighting apparatus to pass freely.

The lighting apparatus 2 is pivotally mounted at 2a on a carriage 6 which is adapted to move along the track. The purpose of this pivotal mounting is to enable the beam of light, for any position of the carriage, to be orientated on either side of a medial position M, M' as far as extreme positions L, L' and $L_1$, $L'_1$ that form an angle, for example of 15°, with the medial position, the purpose of this orientation being to meet certain operational requirements.

The longitudinal movements of the carriage 6 along the track are controlled, for example by means of an electric motor 27 which is secured to said carriage and which actuates, by means of a suitable speed reducer 28, driving rollers 29 that roll in suitable grooves 30 of the track.

In order to retain a perfect mobility of the lighting apparatus in its non-horizontal movements for which the actual weight of the movable system produces a vertical force, a special balancing device is provided.

This device (see in particular Fig. 8) essentially comprises, on each of the side faces of the track, a counterweight 31 fixed to the lower end of a cable 32 which passes over a return pulley 33 and is attached to a helically grooved pulley 34, the shaft 35 of which is mounted at the end of the horizontal portion of the track which is joined to the circular portion. On the shaft 35 of the helically grooved pulley 34 is fixed, inside the track, a second pulley 36 of constant diameter, on which a cable 37 is adapted to wind, the free end of said cable being provided with a fastening ring 38. The beam 6 that supports the lighting apparatus is provided on each side with a hook 39 which is adapted to engage automatically in the ring 38 when the movable system is about to start its circular travel.

Thus, it can be seen that when the movable system rocks and moves away from its horizontal position, the hook 39 pulls the cable 37 and the downward vertical force of the movable system is compensated by the pull of the cable 32 which is subjected to the action of the counterweight 31. It is obvious that the shape and the pitch of the helical groove of the pulley 34 are so calculated as to ensure a perfect balance of the movable system throughout its travel along the circular portion of the track.

The supply of electric current to the motor 27 and to the lighting apparatus 2 is effected by means of a suitable number of cables 40 which are adapted to wind on suitable drums 41 after they have passed over a return drum 42. The drums 41 are driven at the requisite speed for the cables 40 never to be slack, irrespective of the position of the lighting apparatus.

The motors that control either the longitudinal movements, or the movements in all azimuths (in the case of Fig. 1) of the lighting apparatus, are remote controlled, for example from inside the operating room 1 itself, by means of a control box 43 provided with contactors which are suitably connected to the supply cables of the motors.

The embodiments of the invention in which an exclusive property or privilege is claimed are defined as follows:

1. Lighting equipment for operating rooms having a transparent false ceiling in spaced relationship to the ceiling proper, defining an upper chamber for accommodating the lighting apparatus which floods through said transparent false ceiling a horizontal field of operation, comprising in combination, a track located in said upper chamber, in the form of an arc of a circle prolonged by a horizontal rectilinear portion extending parallel and just above the horizontal field of operation at a distance from said horizontal field equal to the radius of the arcuate portion of the track, a carriage movable longitudinally along both portions of said track and supporting the lighting apparatus and means for remotely controlling the movement of the movable carriage along the track so that whatever be the position of the lighting apparatus, the lighting of the field of operation, at the desired point is always constant.

2. A lighting equipment for operating rooms according to claim 1 wherein said track is mounted for rotation on a vertical pivot, the axis of rotation of which extends through the junction of said arcuate and straight portions of the track.

3. Lighting equipment for operating rooms according to claim 1, comprising an electric motor secured to the carriage supporting the lighting apparatus, means for imparting longitudinal movements to said carriage along the track, said electric motor actuating said means, flexible current supply connections for said lighting apparatus and said motor, a return drum for said flexible connections, rollers on said return drum enabling it to move along said track half as fast as the lighting apparatus, said connections being trained around said rollers thereby to remain substantially taut regardless of the position of said carriage.

CHRISTIAN LOUIS GEORGES BÉNARD.

REFERENCES CITED

The following references are of record in the file of this patent:

UNITED STATES PATENTS

| Number | Name | Date |
|---|---|---|
| 243,406 | Sample et al. | June 28, 1881 |
| 1,631,488 | Jones | June 7, 1927 |
| 1,871,919 | Katz | Aug. 16, 1932 |
| 2,114,664 | Gelb | Apr. 19, 1938 |
| 2,243,788 | Benard | May 27, 1941 |
| 2,249,610 | James et al. | July 15, 1941 |
| 2,442,297 | Link, Jr. | May 25, 1948 |